No. 834,075. PATENTED OCT. 23, 1906.
E. M. PHILLIPS.
STOPPER FOR MILK BOTTLES.
APPLICATION FILED MAY 23, 1906.
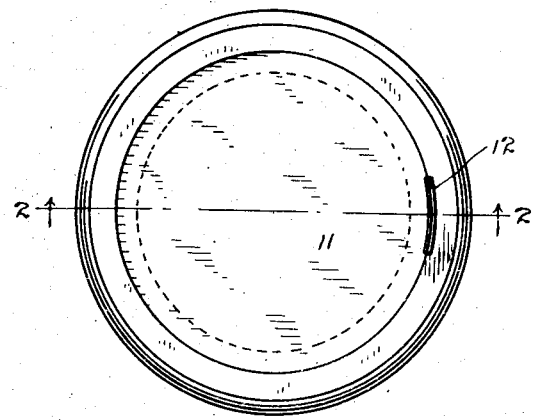
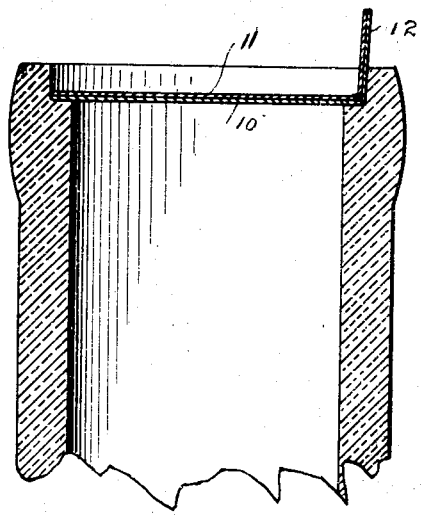
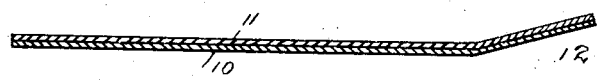
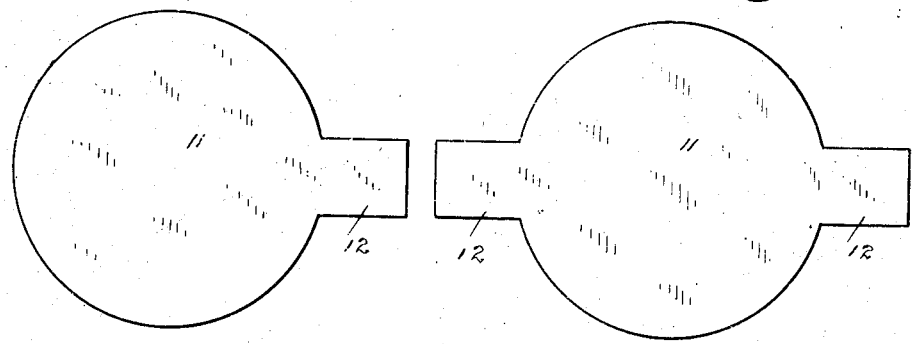
WITNESSES
H. A. Lamb.
S. W. Atherton.
INVENTOR.
Elizabeth M. Phillips
BY
A. M. Wooster
ATTORNEY

UNITED STATES PATENT OFFICE.

ELIZABETH M. PHILLIPS, OF GLENBROOK, CONNECTICUT.

STOPPER FOR MILK-BOTTLES.

No. 834,075.　　　Specification of Letters Patent.　　　Patented Oct. 23, 1906.

Application filed May 23, 1906. Serial No. 318,359.

*To all whom it may concern:*

Be it known that I, ELIZABETH M. PHILLIPS, a citizen of the United States, residing at Glenbrook, county of Fairfield, State of Connecticut, have invented a new and useful Stopper for Milk-Bottles, of which the following is a specification.

This invention relates to the class of stoppers for jars, cans, and bottles, more especially cream and milk bottles, for which Letters Patent No. 625,197 were granted to me May 16, 1899, and my present invention is an improvement upon and carrying forward of my said former invention, the object being to provide a stopper of this character which shall have all the advantages of my said former stopper in that it shall be perfectly tight and adapted to be easily removed without injury to the jar or bottle and shall be even less expensive to produce, in addition to which I provide a stopper that shall be wholly non-absorbent and sterile, which cannot take up any of the contents of the jar or bottle even should the latter be upset, and which cannot under any circumstances have the slightest effect upon or be in any way affected by the contents of the jar or bottle.

With these and other objects in view I have devised the novel stopper of which the following description, in connection with the accompanying drawings, is a specification, reference characters being used to indicate the several parts.

Figure 1 is a plan view of a milk or cream bottle, illustrating the application thereto of my novel stopper; Fig. 2, a sectional view on the line 2 2 in Fig. 1; Fig. 3, a section of the stopper detached; and Figs. 4 and 5 are plan views illustrating stoppers provided, respectively, with one and two removing-tabs.

My novel stopper consists of two plies only—to wit, a non-absorbent moisture-proof and sterile ply (indicated by 10) and a stiffening-ply (indicated by 11)—and is provided with one or more removing-tabs, (indicated by 12.) The non-absorbent moisture-proof ply is made of textile material saturated with paraffin or any similar sterile substance that will make it thoroughly impervious to moisture. The stiffening-ply is made of paper or pasteboard, hard-finished, and may, if preferred, be made of a plurality of independent plies firmly rolled together and caused to adhere to each other. The tabs are formed integral with the two plies.

The advantages of my present construction will be obvious. By making the inner ply of textile material I insure ample strength for all the purposes of use and insure that the tabs will not pull out, thus permitting the stoppers to be removed without the slightest injury either to the jar or bottle or to the stopper itself, so that the stopper may be replaced in the bottle and used over and over again when the contents of the jar or bottle are not all used when first opened. By saturating the inner ply with paraffin or any similar sterile substance I make the stoppers absolutely impervious to moisture even should the bottles be upset, and, furthermore, insure that the stoppers will be at all times perfectly sanitary. The tabs may be scored at the intersection with the stoppers so that they will fold inward, which permits the stoppers to be packed closely together for shipment. The stiffening-ply is made thick enough and rigid enough to give any required amount of rigidity to the stopper and tab or tabs, so that the stoppers are admirably adapted for use in closing large-sized cans and jars. The two plies are firmly cemented or otherwise securely united to each other, so that there will be no danger of their separating at the edges, thus insuring a perfectly tight closure of the jar or bottle and permitting the stoppers to be used as many times as may be required until the contents of the jar or bottle is used up. The edges of the stopper are of course sufficiently flexible to permit them to make a close engagement with the neck of the jar or bottle entirely around so that air cannot enter the jar or bottle or the contents leak out under the ordinary or even extraordinary conditions of use. As the inner ply is impervious to moisture, it is rendered impossible for the stiffening-ply to become saturated with the contents of the bottle or for the contents to become tainted by any glue or cement that may be used in the outer ply or in securing the plies together. In use the tabs bend inward at the intersection with the body and do not interfere to the slightest extent in making a perfect closure, thus enabling the bottles or jars to be closed very rapidly either by hand or mechanically and it will be understood that as the projecting portions of the upper ply and under ply are cemented together the pulling tab or tabs formed thereby will be practically a unitary structure, and therefore in pulling the stopper from the bottle there is no liability of tearing the two plies apart and practically no liability of tearing the tabs from the plies.

Having thus described my invention, I claim—

A stopper of the character described comprising an upper ply of stiffening material, said upper ply being provided with a projecting portion, and an under ply of textile fabric coated with paraffin, said under ply being provided with a projecting portion, the upper ply and the under ply having their body portions and projecting portions cemented together, the said projecting portions being bent upwardly to form pulling-tabs.

In testimony whereof I affix my signature in presence of two witnesses.

ELIZABETH M. PHILLIPS.

Witnesses:
S. G. STARR,
WM. N. TRAVIS.